United States Patent
Briones

Patent Number: 5,697,235
Date of Patent: Dec. 16, 1997

[54] STEERING COLUMN AND STEERING WHEEL SECURING SYSTEM

[76] Inventor: Mario E. Briones, 832 S. Linwood, Visalia, Calif. 93277

[21] Appl. No.: 582,952

[22] Filed: Jan. 4, 1996

[51] Int. Cl.⁶ .................................................. E05B 73/00
[52] U.S. Cl. ........................ 70/209; 70/18; 70/237; 70/426; 70/417; 70/227
[58] Field of Search .......................... 70/209, 211, 417, 70/18, 19, 237, 428, 14, 15, 238, 423, 212, 424, 425, 426, 227

[56] References Cited

U.S. PATENT DOCUMENTS

| | | | |
|---|---|---|---|
| 1,414,991 | 5/1922 | McKeage | 70/211 |
| 1,420,853 | 6/1922 | Long | 70/211 |
| 1,863,503 | 6/1932 | Schlitz | 70/34 |
| 3,811,303 | 5/1974 | Robertson | 70/18 |
| 4,318,288 | 3/1982 | Rifat | 70/425 |
| 4,561,273 | 12/1985 | Robinson | 70/426 |
| 4,598,562 | 7/1986 | Freeman | 70/417 |
| 4,955,215 | 9/1990 | Eremita | 70/417 |
| 5,197,315 | 3/1993 | Zaroroff | 70/417 |
| 5,212,970 | 5/1993 | Harrell | 70/417 |
| 5,461,891 | 10/1995 | Noel | 70/209 |
| 5,540,065 | 7/1996 | Wyers | 70/34 |

*Primary Examiner*—Darnell M. Boucher

[57] ABSTRACT

A steering column and steering wheel securing system comprising an upper component in a half box configuration having an upper face, parallel front and rear faces and side faces therebetween, the front and rear faces and side faces being formed with semi-circular recesses for receiving the upper half of a steering column, the upper component being formed with an exterior undulation adjacent projections on side thereof and with a wedge-shaped projection on the opposite side; a lower component in a half box configuration having a lower face, front and rear faces and parallel side faces therebetween, the front and rear faces being formed with semi-circular recesses for receiving the lower half of a steering column, one side edge being formed with holes for receiving the projections for pivotal coupling with respect to the adjacent side of edge of the upper component, a rectangular recess formed in the edge of the lower component between the projections for passage of a turn signal, the opposite side face of the lower component being formed with an upwardly extending projection with a horizontal edge adapted to lockingly couple with the wedge-shaped projection of the upper component.

1 Claim, 3 Drawing Sheets

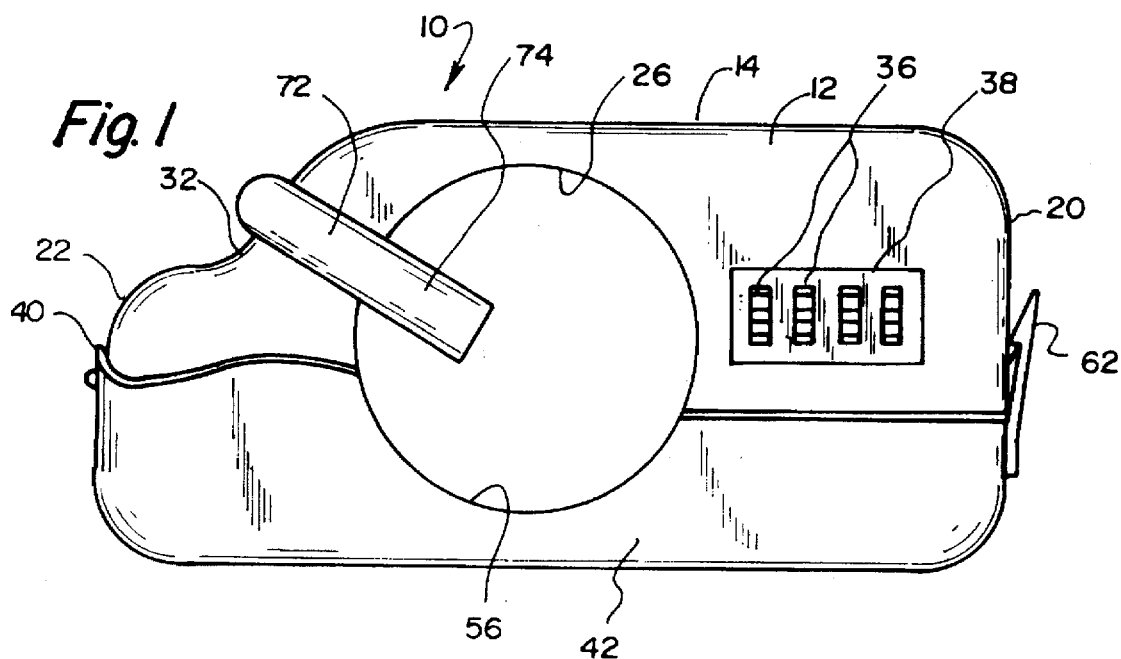
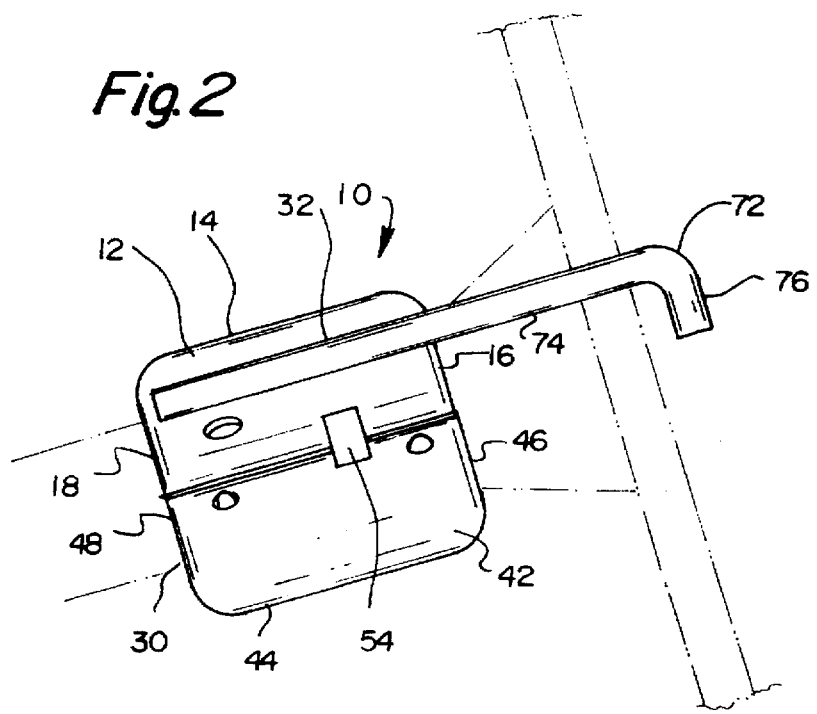

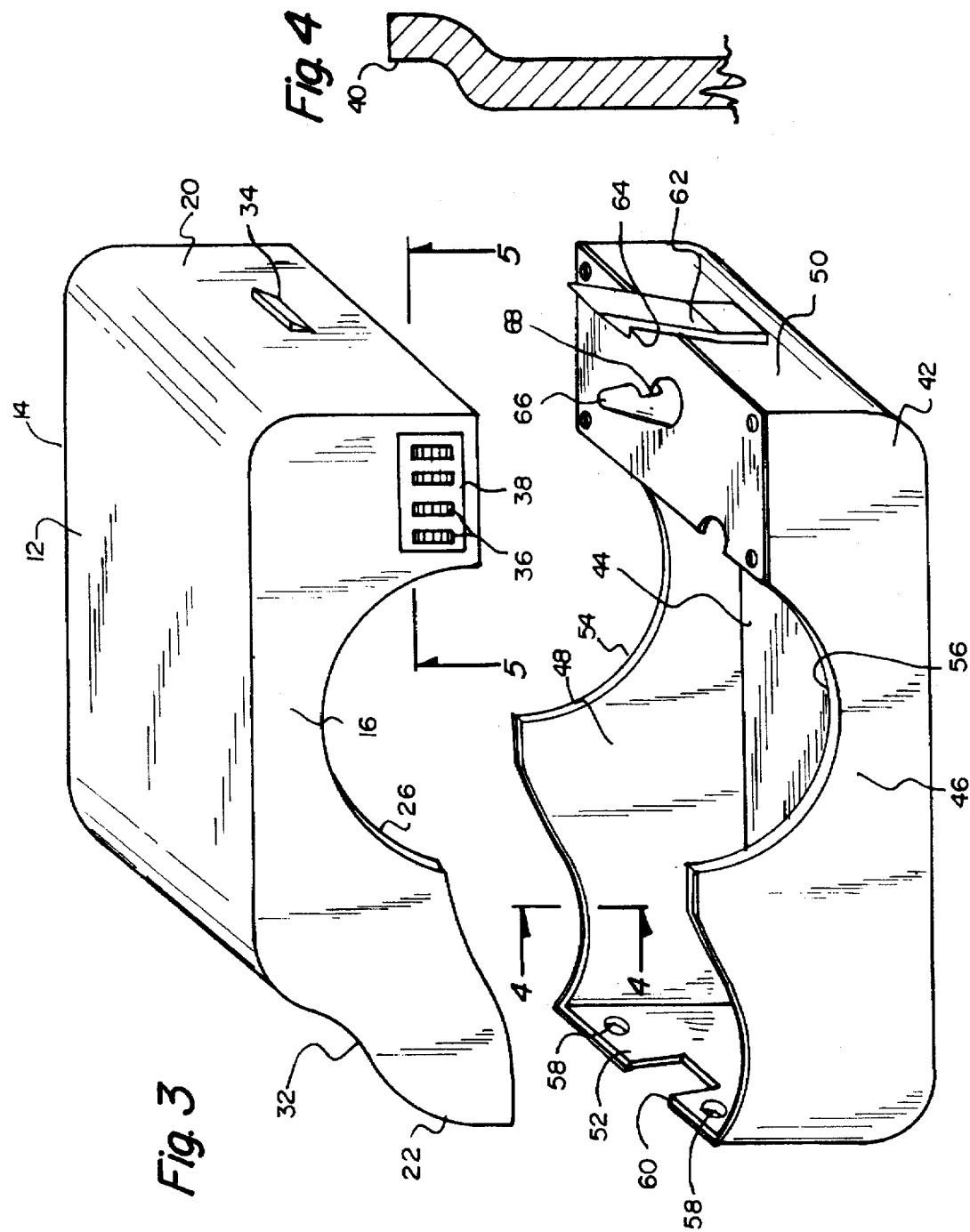

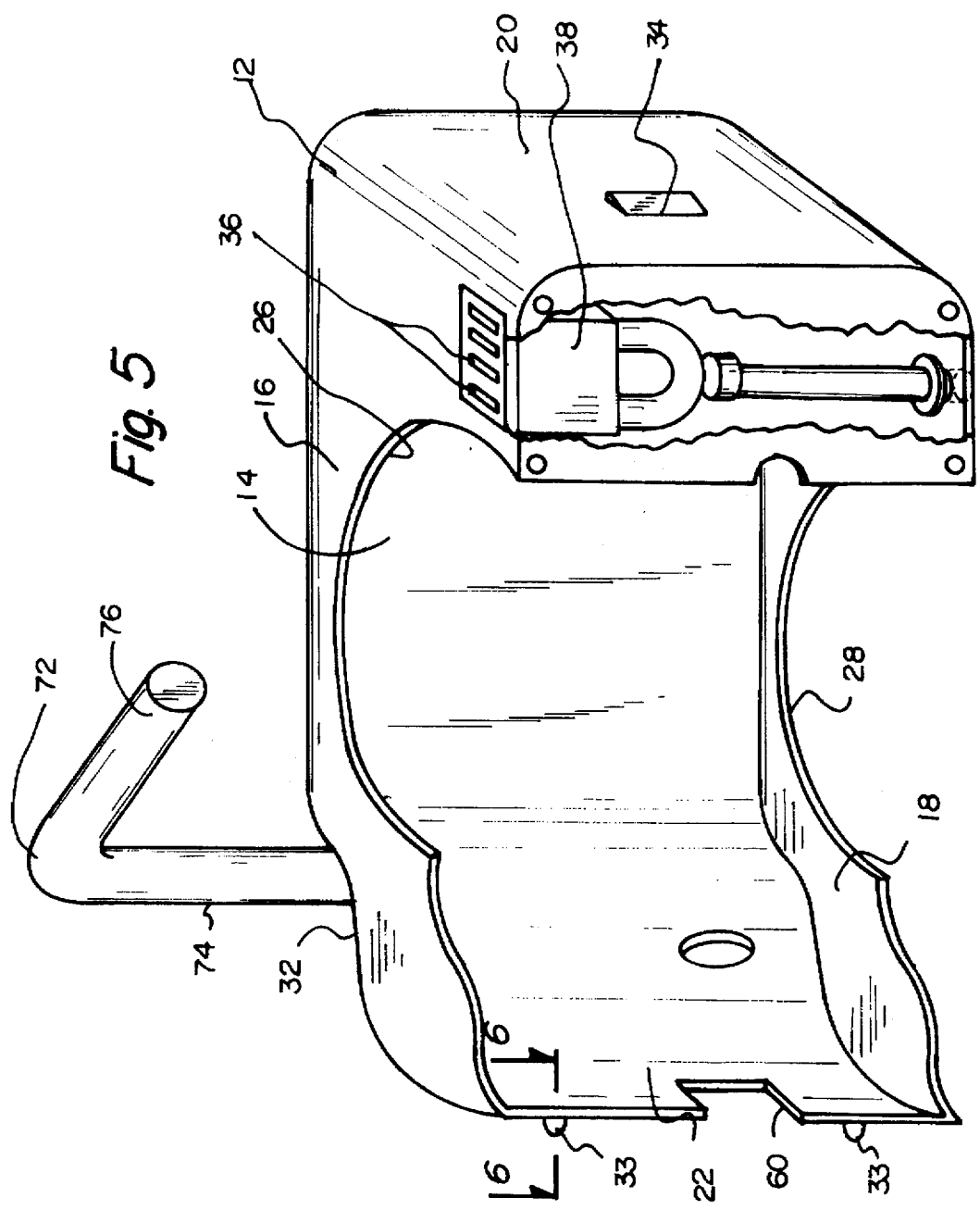

1

STEERING COLUMN AND STEERING WHEEL SECURING SYSTEM

BACKGROUND OF THE INVENTION

1. Field of the Invention

The present invention relates to a steering column and steering wheel securing system and more particularly pertains to preventing the rotation of a steering wheel and for protective of an ignition system of a vehicle.

2. Description of the Prior Art

The use of anti-theft devices for vehicles of various designs and configurations is known in the prior art. More specifically, anti-theft devices for vehicles of various designs and configurations heretofore devised and utilized for the purpose of preventing the rotation of steering wheel of a vehicle and protecting the ignition system of vehicles through various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. Design 349,034 to Webster discloses a steering column lock. U.S. Pat. No. 4,104,895 to Tankel discloses a vehicle steering column ignition lock protective device. U.S. Pat. No. 4,276,761 to Eichenauer discloses a steering column and ignition lock for motor vehicle. U.S. Pat. No. 5,172,576 to Milton discloses an anti-theft steering shaft lock. U.S. Pat. No. 5,216,908 to Malvy discloses a security device, in particular an anti-theft device for the steering wheel of a motor vehicle. Lastly, U.S. Pat. No. 5,295,377 to Moricz et al. discloses a burglar proof lock, especially lock for cars.

While these devices fulfill their respective, particular objectives and requirements, the aforementioned patents do not describe steering column and steering wheel securing system that preventing the rotation of a steering wheel and for protective of an ignition system of a vehicle.

In this respect, the steering column and steering wheel securing system according to the present invention substantially departs from the conventional concepts and designs of the prior art, and in doing so provides an apparatus primarily developed for the purpose of preventing the rotation of a steering wheel and for protective of an ignition system of a vehicle.

Therefore, it can be appreciated that there exists a continuing need for a new and improved steering column and steering wheel securing system which can be used for preventing the rotation of a steering wheel and for protective of an ignition system of a vehicle. In this regard, the present invention substantially fulfills this need.

SUMMARY OF THE INVENTION

In view of the foregoing disadvantages inherent in the known types of anti-theft devices for vehicles of various designs and configurations now present in the prior art, the present invention provides an improved steering column and steering wheel securing system. As such the general purpose of the present, invention, which will be described subsequently in greater detail, is to provide a new and improved steering column and steering wheel securing system and method which has all the advantages of the prior art and none of the disadvantages.

To attain this, the present invention essentially comprises a new and improved steering column and steering wheel securing system for preventing the rotation of the steering wheel and protection of the ignition system comprising an upper component in a half box configuration having an upper face, parallel front and rear faces and side faces therebetween, the front and rear faces and side faces being formed with semi-circular recesses for receiving the upper half of a steering column, the upper component being formed with an exterior undulation adjacent two projections on side thereof and with a wedge-shaped projection on the opposite side, the upper component also having rotatable wheels as part of a combination lock, the periphery of the upper component being formed with a locking lip for receiving an adjacent component; a lower component in a half box configuration having a lower face, front and rear faces and parallel side faces therebetween, the front and rear faces being formed with semi-circular recesses for receiving the lower half of a steering column, one side edge being formed with two holes for receiving the two projections for pivotal coupling with respect to the adjacent side of edge of the upper component, a rectangular recess formed in the edge of the lower component between the projections for passage of a turn signal, the opposite side face of the lower component being formed with an upwardly extending projection with a horizontal edge adapted to lockingly couple with the wedge-shaped projection of the upper component, the lower component also having an upwardly extending conical latch with a notch for coupling with components of the combination lock to effect the locking and unlocking of the upper component with respect to the lower component; and an L-shaped bar having an elongated component secured to the upper component at the undulation and a short component positioned adjacent to a steering wheel to abate rotation thereof.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved steering column and steering wheel securing system which has all of the advantages of the prior art anti-theft devices for vehicles of various designs and configurations and none of the disadvantages.

It is another object of the present invention to provide a new and improved steering column and steering wheel securing system which may be easily and efficiently manufactured and marketed.

It is further object of the present invention to provide a new and improved steering column and steering wheel securing system which is of durable and reliable constructions.

An even further object of the present invention is to provide a new and improved steering column and steering wheel securing system which is susceptible of a low cost of manufacture with regard to both materials and labor, and which accordingly is then susceptible of low prices of sale to the consuming public, thereby making such steering column and steering wheel securing system economically available to the buying public.

Still yet another object of the present invention is to provide a new and improved steering column and steering wheel securing system which provides in the apparatuses and methods of the prior art some of the advantages thereof, while simultaneously overcoming some of the disadvantages normally associated therewith.

Even still another object of the present invention is to provide a steering column and steering wheel securing system for preventing the rotation of a steering wheel and for protective of an ignition system of a vehicle.

Lastly, it is an object of the present invention to provide a new and improved steering column and steering wheel securing system comprising an upper component in a half box configuration having an upper face, parallel front and rear faces and side faces therebetween, the front and rear faces and side faces being formed with semi-circular recesses for receiving the upper half of a steering column, the upper component being formed with an exterior undulation adjacent projections on side thereof and with a wedge-shaped projection on the opposite side; a lower component in a half box configuration having a lower face, front and rear faces and parallel side faces therebetween, the front and rear faces being formed with semi-circular recesses for receiving the lower half of a steering column, one side edge being formed with holes for receiving the projections for pivotal coupling with respect to the adjacent side of edge of the upper component, a rectangular recess formed in the edge of the lower component between the projections for passage of a turn signal, the opposite side face of the lower component being formed with an upwardly extending projection with a horizontal edge adapted to lockingly couple with the wedge-shaped projection of the upper component; and an bar having an elongated component secured to the upper component at the undulation and a short component positioned adjacent to a steering wheel to abate rotation thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top elevational view of the preferred embodiment of the steering column and steering wheel securing system constructed in accordance with the principles of the present invention.

FIG. 2 is a side elevation view as shown in FIG. 1 operatively positioned with respect to a steering column and steering wheel of a vehicle adapted to be protected.

FIG. 3 is an exploded perspective view of the apparatus shown in FIGS. 1 and 2.

FIG. 4 is a cross sectional view taken along line 4—4 of FIG. 3.

FIG. 5 is a cross sectional view taken along line 5—5 of FIG. 3.

FIG. 6 is a cross sectional view taken along line 6—6 of FIG. 5.

The same reference numerals refer to the same parts through the various Figures.

DESCRIPTION OF THE PREFERRED EMBODIMENT

With reference now to the drawings, and in particular to FIG. 1 thereof, the preferred embodiment of the new and improved steering column and steering wheel securing system embodying the principles and concepts of the present invention and generally designated by the reference numeral 10 will be described.

The present invention, the steering column and steering wheel securing system 10 is comprised of a plurality of components. Such components in their broadest context include a an upper component, a lower component and an L-shaped bar with an associated combination lock. Such components are individually configured and correlated with respect to each other so as to attain the desired objective.

Specifically, the present invention is a system 10. Its principle component are mating up and lower components. The upper components 12 is formed in the shape of a half box configuration. Such half box configuration has an upper face 14 with parallel front and rear faces 16 and 18. In association therewith side faces 20 and 22 are located between the front and rear faces and secured thereto as well as secured to the upper face to provide an open lower region and hollow interior.

The front and rear faces are formed with semi-circular recesses 26 and 28. Such recesses are for receiving the upper half of a steering column 30. The upper component is also formed with an exterior undulation 32 and two projections 33. Such are on one side face of the upper component. A wedge-shaped projection 34 is located on the opposite of the upper component. The upper component also has rotatable wheels 36 as part of a combination lock 38. For securement with the lower component, the periphery of the upper component is formed with a locking lip 40 extending outwardly for receiving the adjacent component of the lower component.

The lower component 42 is, like the upper component, formed in a half box configuration. It has a lower face 44 and front and rear faces 46 and 48. Parallel sides 50 and 52 are located between the front and rear faces and coupled at their edges to the adjacent edges of the lower face.

The front and rear faces of the lower component are formed with semi-circular recesses 54 and 56. Such recesses are for receiving the lower half of a steering column. One side edge is formed with two holes 58 for receiving the two projections. The relationship between the projections and recesses is to allow pivotal coupling of the upper and lower components with respect to each other. In addition a rectangular recess 60 is formed in the edge of the lower component between the holes. This is for the passage of a turn signal to exterior of the system.

The opposite side face of the lower component is formed with an upwardly extending projection 62 of a resilient material. It is formed with a horizontal edge 64. Such edge is adapted to lockingly couple with the wedge-shaped projection of the upper component. The lower component also has an upwardly extending conical latch 66. Such latch is formed with a notch 68 for coupling with the components of the combination lock to effect the locking and unlocking of the upper component with respect to the lower component. More specifically, when the wheels of the combination lock are in the unique orientation, the U-shaped component with an adjacent post will allow the movement of a lower finger to exterior of the notch in the conical projection to allow separation of the upper and lower components. When the wheels are not in the proper orientation for release purposes, the finger will be located within the notch of the conical projection to maintain the upper and lower components locked with respect to each other. The combination lock assembly is conventional and is described in the prior art.

The last component of the system is a L-shaped bar 72. Such L-shaped bar has an elongated component 74 secured to upper component at the undulation. The L-shaped bar also has a short component 76 positioned adjacent to the steering wheel and extending therethrough. Such an orientation is such as to abate rotation of the steering wheel to preclude the theft of the vehicle while the upper and lower components around the ignition system also function to protect the ignition system from theft. The bar is preferably affixed as through welding or the like for any one particular application. In the alternative, the bar may be secured in any one of a plurality of alternate positions as through bolts accessible from the interior of the upper component when separated from the lower component. Such will allow adjustment of the bar in order to accommodate any one of a plurality of vehicles with components of various sizes and shapes.

The present invention is an improved steering column and wheel securing device that prevents the removal of the steering wheel and protects the ignition. The device is constructed of durable stainless steel. It is designed to fit specific makes and models of vehicles, and can be adapted to fit all types. The present invention consists of a case having two pieces, an extension bar, and a lock assembly. The case pieces have a mating lip around the entire perimeter to ensure proper alignment, and a semi-circular opening that forms a complete circle to fit around the steering column when properly installed. A hinge is positioned on one side, and a locking clamp is positioned on the opposite side thereof. a digital lock located in the front end secures the two pieces together when closed. A metal rod extends out to the front from the top of the outer side and terminates in a right angle bend. This wraps over the center of the steering wheel when the unit is locked into place. In use, the present invention will deter thieves because it prevents access to the center hub of the steering wheel. When properly locked into place, it prevents tampering with the ignition switch and removal of the steering wheel.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved steering column and steering wheel securing system for preventing the rotation of the steering wheel and protection of the ignition system comprising, in combination:

an upper component in a half box configuration having an upper face, parallel front and rear faces and side faces therebetween, the front and rear faces being formed with semi-circular recesses spaced apart by a first distance for receiving the upper half of a steering column, the upper component being formed with an exterior undulation with two projections on a side thereof and with a wedge-shaped projection on the opposite side, the periphery of the upper component being formed with a locking lip for receiving an adjacent component, a rectangular recess formed in an edge of the upper component;

a combination lock mounted within the upper component with rotatable wheels extending through the front face to secure the positioning of the wheels with respect to the front face;

a lower component in a half box configuration having a lower face, front and rear faces and parallel side faces therebetween, the front and rear faces being formed with semi-circular recesses spaced apart by a second distance equal to the first distance for receiving the lower half of a steering column to encompass the steering column and steering wheel between the upper and lower components, one side edge being formed with two holes for receiving the two projections for pivotal coupling with respect to the adjacent side of edge of the upper component, a rectangular recess formed in the edge of the lower component between the projections in communication with the rectangular recess of the upper component for passage of a turn signal, the opposite side face of the lower component being formed with an upwardly extending projection with a horizontal edge adapted to lockingly couple with the wedge-shaped projection of the upper component, the lower component also having an upwardly extending conical latch with a notch for coupling with components of the combination lock to effect the locking and unlocking of the upper component with respect to the lower component; and an L-shaped bar having an elongated component secured to the upper component at the undulation and a short component positioned adjacent to a steering wheel to abate rotation thereof.

* * * * *